(12) United States Patent
Cawley (10) Patent No.: US 6,202,530 B1
(45) Date of Patent: Mar. 20, 2001

(54) GLASS CUTTING DEVICE

(75) Inventor: Robert Cawley, Barto, PA (US)

(73) Assignee: Professional Glass Tools, Inc., Center Valley, PA (US)

( * ) Notice: Subject to any disclaimer, the term of this patent is extended or adjusted under 35 U.S.C. 154(b) by 0 days.

(21) Appl. No.: 09/182,696

(22) Filed: Oct. 29, 1998

Related U.S. Application Data (63) Continuation of application No. 08/701,111, filed on Aug. 21, 1996, now abandoned.
(60) Provisional application No. 60/002,760, filed on Aug. 24, 1995.

(51) Int. Cl.[7] ....................................................... B26D 3/08
(52) U.S. Cl. ..................... 83/879; 33/27.032; 33/27.07; 83/452; 83/733; 269/57; 269/303; 269/900
(58) Field of Search ........................... 83/879, 733, 410.9, 83/452, 454, 455; 269/57, 900, 91, 303, 307; 33/27.07, 27.032; 225/96

(56) References Cited

U.S. PATENT DOCUMENTS

| | | | |
|---|---|---|---|
| 325,855 | * | 9/1885 | Munford . |
| 824,966 | * | 7/1906 | Werner . |
| 1,515,129 | * | 11/1924 | Mayer . |
| 2,653,633 | * | 9/1953 | Anderson . |
| 3,227,016 | * | 1/1966 | Moeller . |
| 3,995,521 | * | 12/1976 | Raphael . |
| 4,120,220 | * | 10/1978 | Mullen . |
| 4,327,786 | * | 5/1982 | Markkula . |
| 4,497,477 | * | 2/1985 | Abel . |
| 5,044,245 | * | 9/1991 | Molleker et al. . |
| 5,558,565 | * | 9/1996 | Dedonato . |

* cited by examiner

Primary Examiner—Kenneth E. Peterson
(74) Attorney, Agent, or Firm—Caesar, Rivise, Bernstein, Cohen & Pokotilow, Ltd.

(57) ABSTRACT

A device used as an aid in scoring polygonal shapes into glass having a platen rotatable on a base and a compression arm secured to the base, the platen having grid markings and circular markings intersecting the grid markings, and holes at certain of the grid markings into which locating pins, straight edges and clamps can be inserted, the base having a circular recess, the platen being seated into the circular recess, the compression arm being secured to the base and having a glass engaging clamp, the compression arm extending over the platen to secure a piece of glass between the glass engaging clamp and the platen to facilitate a straight line to be manually scored using a hand scoring device, the platen being a held by a retaining force variably applied to hold the platen position by the glass engaging clamp during the scoring operation.

3 Claims, 7 Drawing Sheets

GLASS CUTTING DEVICE

RELATED APPLICATIONS

This application is a continuation application of application Ser. No. 08/701,111, filed on Aug. 21, 1996, titled "Glass Cutting Device" now abandoned.

This application claims the benefit of the filing date of provisional application Ser. No. 60/002,760, filed on Aug. 24, 1995.

BACKGROUND OF THE INVENTION

The present invention is directed to a cutting device for easily and reproducibly cutting glass such as stained glass, especially when regular and/or irregular shapes need to be cut.

BRIEF DESCRIPTION OF PRIOR ART

The process of hand scoring and breaking glass into geometric shapes has been known for more than hundred of years.

Numerous devices to aid this process have been developed. Some early devices, such as Munford, U.S. Pat. No. 325,855, is fully capable of scoring intricate geometric shapes. However, each angle scores would require an individual setup including the positioning of the glass.

The glass cutting machine patented by Mayer (U.S. Pat. No. 1,515,129), although having a circular platen was developed for producing rectangular glass plates in quantity and is limited to 900 angles.

Another group of glass scoring devices have been developed to produce rectangular glass, e.g., R. J. Louviaux et al. (U.S. Pate. No. 2,273,716), W. M. Arck (U.S. Pat. No. 2,812,579), T. W. Macaulay (U.S. Pat. No. 2,845,713), C. H. Moeller (U.S. Pat. No. 3,227,016), but these devices do not have the capability of scoring other than 90° angles.

Another group of glass scoring devices allows the user to score non-linear, free-form shapes by moving the glass by hand under the scoring instrument. The ability to score intricate geometric forms is left solely to the ability of the user, making accuracy, repeatability and production rate very low. An example of this type of device was patented by Mullen (U.S. Pat. No. 4,120,220).

Another group of devices were developed primarily for making circular glass, e.g., Molleger et al. (U.S. Pat. No. 5,044,245), and is incapable of geometric forms with flat or straight sides.

The Able glass scoring device (U.S. Pat. No. 4,497,477) is currently the standard device for use by the small stained glass crafts person. This device, although more versatile in some ways than the first mentioned Munford device, is much more difficult to set up and much less accurate than the Munford device. Set ups, other than 90° are complex and time consuming. Each new score line requires a new setup.

Thus, the prior art has not addressed the need to produce regular and irregular polygon shapes or glass quickly, accurately and repeatedly with a minimum of setups.

The technique of cutting glass by scoring the surface and subsequently breaking it at the score mark has, of course, been known for many years. Over the years, numerous accessories have been developed to assist the operator in effectuating the glass cutting process. Among these have been tables having a specific surface thereon to facilitate the glass cutting operation without scratching the glass surface, guide elements to guide the cutting tool to accurately cut the glass in a straight line, and devices to enable the user to cut small, odd-shaped pieces of glass.

Typical of this latter category of devices is the apparatus shown in U.S. Pat. No. 4,120,220. This apparatus enables a user to cut odd-shaped pieces of glass by disposing a glass cutter in a retaining arm over a work table such that the operator may use both hands to manipulate the glass piece. Alternatively, the glass piece may be secured to the cutting surface and the entire cutting arm moved If the operator so desires. However, this typical apparatus suffers a serious drawback that is shared by virtually all of the prior art devices intended for the home/hobbyist user, that is the collection of glass chips generated by the glass cutter on the work table surface. These chips may cause scratching of the glass surface, injury to the hands of the user, and almost certain inconvenience by the requirement to constantly dean the work table.

The problem of glass chips scratching the surface of the glass that is being cut has long been recognized in commercial glass cutting operations and several solutions have been put forth (see U.S. Pat. Nos. 2,578,919, 2,595,079 and 2,273,716). These solutions have generally involved placing a plurality of longitudinal ridges on the top of the glass cutting table such that the glass pane being cut rests on the top of the ridges and the glass chips fall between the ridges. In the field of commercial glass cutting operations, which generally cuts panes of glass of relatively large size for windows, doors, picture frames, etc., this solution has been perfectly acceptable. However, for the home/hobbyist user has substantially different criteria for cutting relatively small, irregularly shaped pieces of glass for art works than does the commercial business establishment which cuts almost solely rectangular, rather large glass panes. The prior art solutions mentioned above achieve their affect through a table structure having attached thereto, or integrally formed therewith, the plurality of parallel ridges to collect the glass chips. Obviously, for a home user who must often pursue his hobby without benefit of a separate workshop area, a complete table structure having no other use than for cutting lass is not practical. Furthermore, the hobbyist user must cut various small pieces of glass into highly irregular shapes, which is not possible on glass cutting surfaces utilizing a plurality of longitudinal ridges. Even if the ridges were spaced closely enough together to support the glads while being cut, the irregular shapes encountered by the hobbyist user would invariably require a cut parallel to the support ridges. Obviously, this would cause a breakage of the glass if too much pressure on the cutting tool were exerted, and insufficient scoring of the glass if too little pressure were exerted.

One prior art device attaches a surface of rubber having parallel ridges on its cutting side which supports the glass pane. This is also of no benefit to the home-hobbyist user, since the rubber surface with the ridges will deform if cutting small pieces of glass, thereby rendering small pieces impossible.

The prior art is also replete with devices for guiding a glass cutter along a particular path. These have primarily involved guide bars or other devices permanently attached to a cutting surface along edges disposed at right angles to each other. Once again, these are primarily used in commercial glass cutting establishments to accurately and repeatedly cut rectangular, relatively large panes of glass. They are of particular import in this type of establishment since it enables the operator to rapidly cut a straight line over a large area. Some of these prior art devices are adjustable to readily enable the operator to cut rectangular glass panes of various sizes. However important these devices may be to the commercial business establishment, they are of virtually no use to the home/hobbyist user.

Another type of device for cutting glass is that shown in U.S. Pat. No. 4,497,477, however this device is difficult to use as it requires a protractor to measure the angles to be cut on a piece of glass which is laborious and time consuming.

BRIEF DESCRIPTION OF THE INVENTION

This invention comprises a device to facilitate the making of regular or irregular polygons.

The device comprises a rotatable platen fitted into a base with a shaft. The glass to be scored is secured to the platen using various positioning and locating devices. A sliding, lockable "T" square (or straight edge) slides over the platen glass with clearance. Using the combination of the rotating platen to achieve the desired angle and sliding the straight edge into the desired position, a standard handheld scoring device is used to score the glass.

With the present invention, any angle within a 360° circumference may be set and scored within seconds. Subsequent angles may also be set and scored to produce an entire sheet of scored, ready to break, triangles or difficult, time consuming more complicated shapes, like pentagons, hexagons, octagons, etc. Larger sheets of glass and glass strips may be scored by sliding and affixing the straight edge to either the left or right hand side of the base and securing the "L" shaped adjustable stops to either the left or right hand in the desired position, then scoring the glass.

An overhead adjustable pressure clamp that extends from either the far left hand or far right hand corner to over the center of the rotating platen will secure the glass to the platen without the use of additional locating or holding devices.

SUMMARY OF THE INVENTION

The device is used to cut glass, especially stained glass and includes a generally rectangular stationary base having an upper and lower surface and a central rotatable platen located in the center of the base on the upper surface thereof. The platen may be removable, is generally circular in shape and rotates in a recessed area with respect to the base or may be rotationally secured to the base so that the upper surface of the platen is located slightly above the upper surface of the base.

The base and platen contain a plurality of grid markings thereon to assist in cutting glass placed thereon. In addition, about the periphery of the platen and being located thereon and/or on the base, are a plurality of markings dividing the generally circular platen into a series of angles, e.g., in 5 or 10 degree increments. If one wishes to cut a piece of glass at a desired angle, one need merely lay the glass on the platen and/or base (depending upon the size of the glass) and then rotate the platen to the desired angle, if necessary, in relation to the stationary base. One can determine the rotation of the platen by noting the initial setting of the platen relative to the base and by then rotating the platen to the desired angle. The glass may then be cut using a typical hand held glass cutting device with use of a conventional T-square which is placed over the glass and so that the T-square also abuts one side of the base.

The lower surface of the base may alternatively include a plurality of channels through which one may slide or secure one or more generally L-shaped adjustable stops so that the stops extend beyond the edge of the base and above the upper surface of the base. One need then merely lay a piece of glass to be cut on the platen and/or base so that the glass for example, extends beyond the base until it reaches the one or more stops. One can then cut the glass at any desired point, e.g., at the point where the glass lays over the edge of the base or at any linear marking on the base, by using a T-square and conventional hand held glass cutting tool. This feature aids the user in cutting large pieces or long strips of glass which may then be cut into a plurality of regular-shaped pieces, e.g., diamond-shaped.

To prevent the glass from moving during the process, the base and/or platen may be made of a slip-resistant surface. Alternatively, a thin piece of rubber or other non-slip material may be inserted between the glass and the platen. In addition, a releasable pressure clamp may be used to temporarily secure the glass adjacent the platen for cutting. The clamp may be located at the end of an arm which is extendable to a position which is approximately at the center of the platen similar to that of the arm on a record player.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
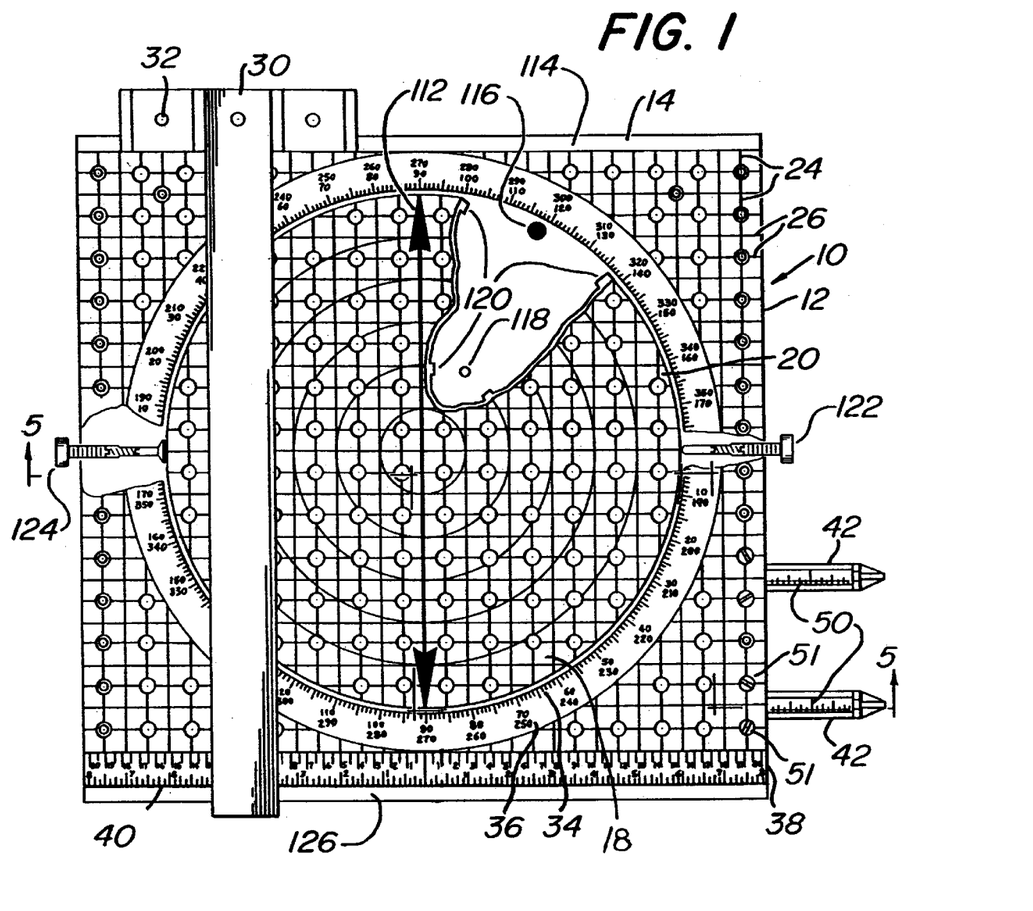
FIG. 1 is a top elevational view of the device of the present Invention showing two generally L-shaped adjustable glass stops protruding from the bottom of the base with a releasably secured longitudinally placed straight edge used for cutting glass being located on the upper surface of the base and rotatable platen.
Figure 2:
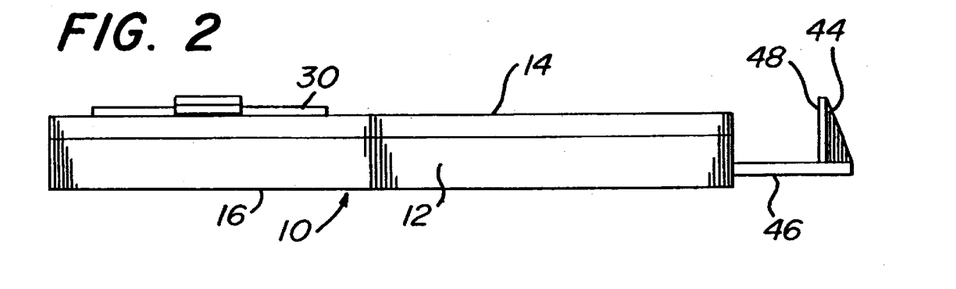
FIG. 2 is a side elevational view of the device of the present invention showing a generally L-shaped adjustable glass stop protruding from the bottom of the base.

Referring now to various figures of the drawings where like reference numerals refer to like parts, there is shown at 10 in FIG. 1, a device constructed in accordance with this invention. The device 10 includes a generally rectangular base 12 having an upper surface 14 and a lower surface 16 (FIG. 2). Located on the upper surface 14 of the base 12 is a removable and generally circular rotatable platen 18 having upper surface 20.

The upper surface 14 of base 12 and the upper surface 20, preferably have a grid type pattern 22 thereon to aid in cutting glass (not shown) in the desired configuration as described in further detail below. The pattern 22 preferably consists of a series of generally evenly spaced apart vertical lines 24 which are perpendicular to and intersect with a series of generally evenly spaced apart horizontal lines 26. A generally circular shape 28 indicates the point of Intersection of each of vertical lines 24 and horizontal lines 26.

Also shown in FIG. 1 are other features of the device 10, which may include a releasably securable longitudinal straight edge 30 located on the upper surface 14 of the base 12. The straight edge 30 may be releasably secured to the base 12 by pins 32 and may be located on any side of the base 12, although it is shown on the upper side of the base 12 in FIG. 1. The straight edge 30 is preferably secured so that a piece of glass to be cut (not shown) may be placed between the straight edge 30 and the upper surface 20 of the platen 18.

To further aid the user in cutting glass in the desired shape is a series of inner indicia 34 and outer indicia 36 located on the upper surface 14 of the base 12 adjacent the platen 18. These indicia 34 and 36 divide the circular platen 18 into a series of degree angles in both a clockwise and counter-clockwise direction by both 10 degree and individual degree increments from 0° to 360° in both clockwise and counter-clockwise directions.

As shown in FIG. 1, located at the lower edge 38 of base 12 is a measuring device 40 having both metric and English system indicia which may be utilized in measuring a piece of glass to the desired dimensions.

The device 10 further may include one or more adjustable stops 42 comprised of a vertical member 44 and horizontal member 46. The vertical member 44 is of a sufficient length to permit it to extend beyond the upper surface 14 of the base to engage a piece of glass adjacent its tip 48. The horizontal member 46 may have indicia 50 printed thereon which is visible when the stop 42 extends outwardly and away from the base 12. One can measure the distance from the tip 48 of the stop 42 by noting the distance printed by the indicia 50 on the stop 42.

Referring again to FIG. 1, arrows 112 are shown for the purpose of orientation of the rotatable platen 18.

See also first glide strip 114 and second glide strip 126 at opposing ends of the rectangular base 12. These glide strips serve as guides for the straight edge 30. Also see glide 116 and glide hole 118. Reference is further made to bearing ways 120.

Figure 3:
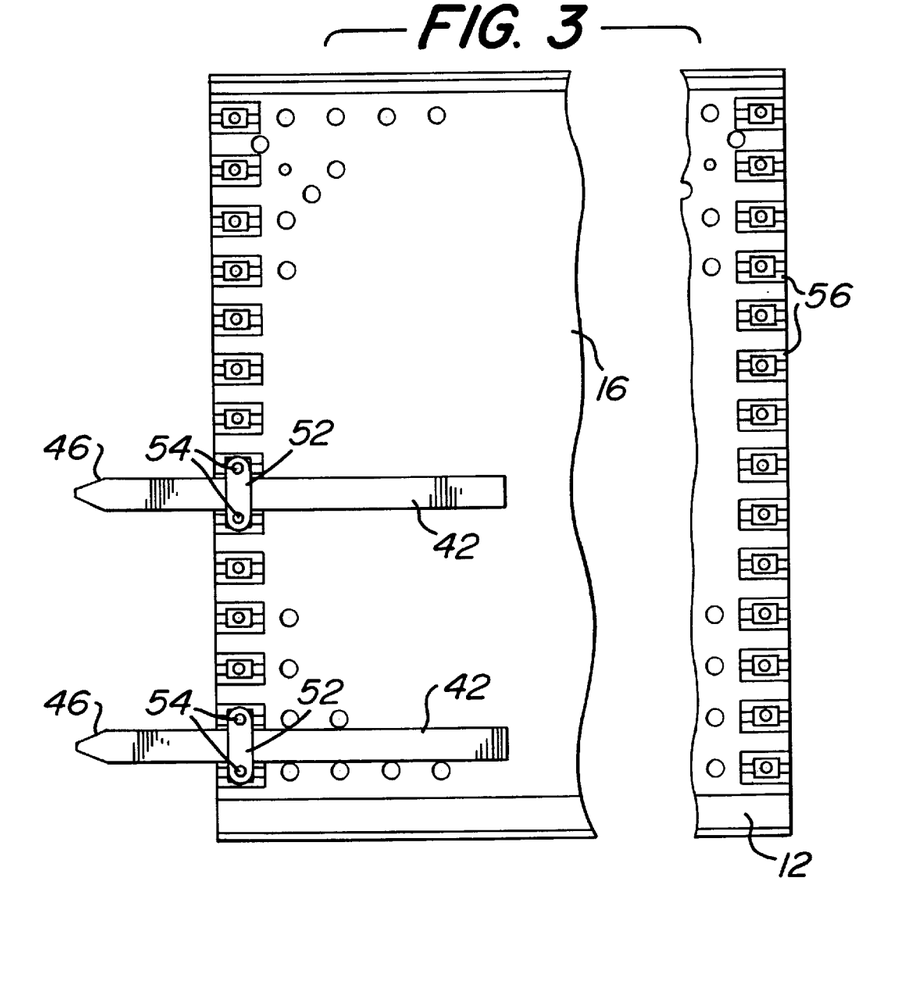
FIG. 3 is a fragmentary bottom view of the device of the present invention showing two generally L-shaped adjustable glass stops protruding from the bottom of the base which may be moved in a slidable fashion through individual sliding members.

As shown in FIG. 3, each of the horizontal members 46 of each of the stops 42 are slidingly engaged in a respective retaining member 52 which may be either fixedly or removably secured to the lower surface 16 of the base 12 by pins 54 stops are slidably moveable and then held at a desired place by tightening of screws.

Figure 4:
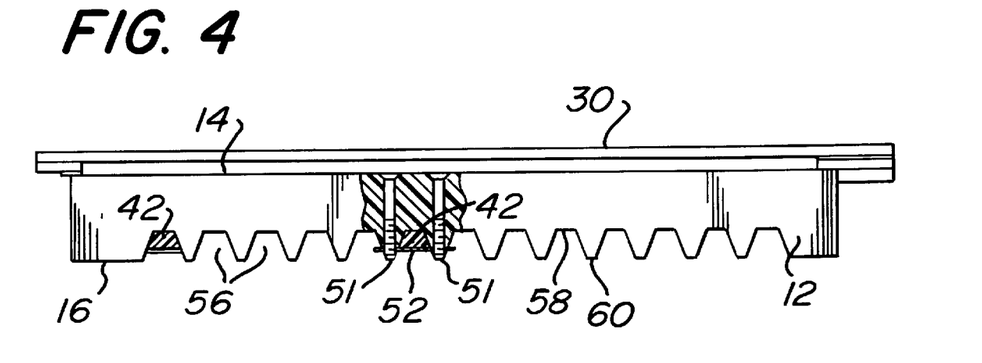
FIG. 4 is an end view of the device of the present invention showing the tips of the two generally L-shaped adjustable glass stops protruding from the bottom of the base and being shown in a broken away portion of the drawing.
Figure 5:
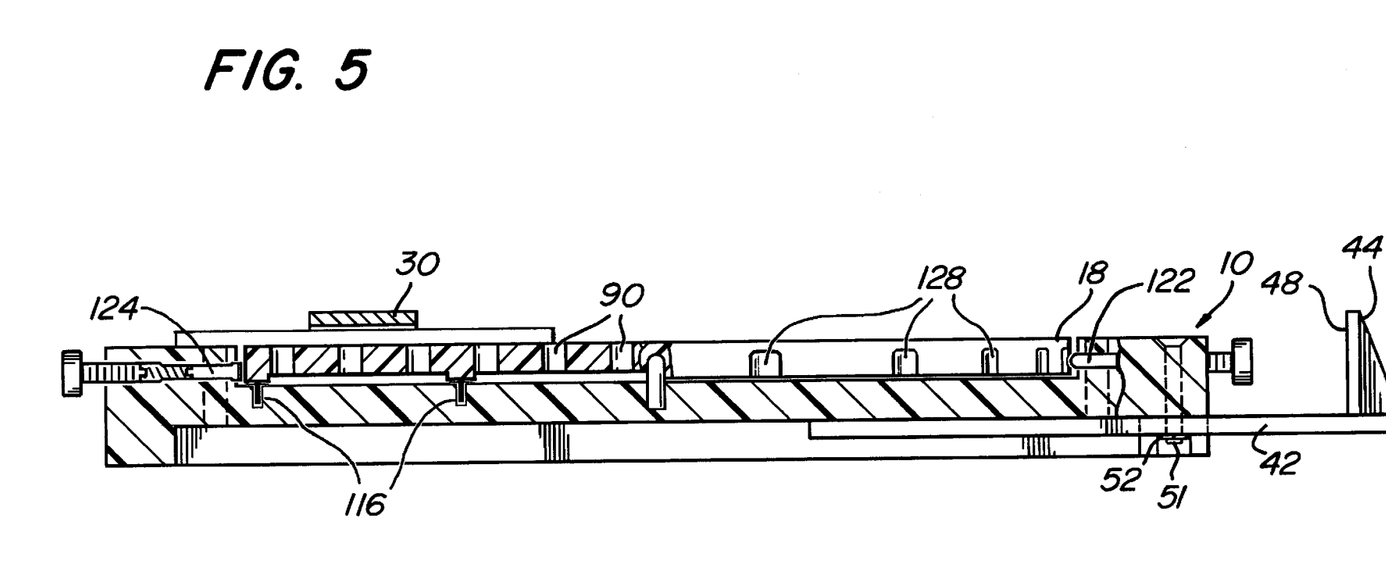
FIG. 5 is a side sectional view taken along the lines 5—5 of FIG. 1.

As shown in FIG. 4, the lower surface 16 of base 12 includes a plurality of evenly spaced apart channels 56 comprised of a trough 58 and a ridge 60. The horizontal member 46 slides through the trough 58 of the channel so that the horizontal member 46 engages the retaining member 52. Preferably the stops 42 have somewhat of a frictional engagement with the base 12 while still permitting the desired movement of the stops 42 to the desired length of protrusion beyond the base 12.

Figure 6:
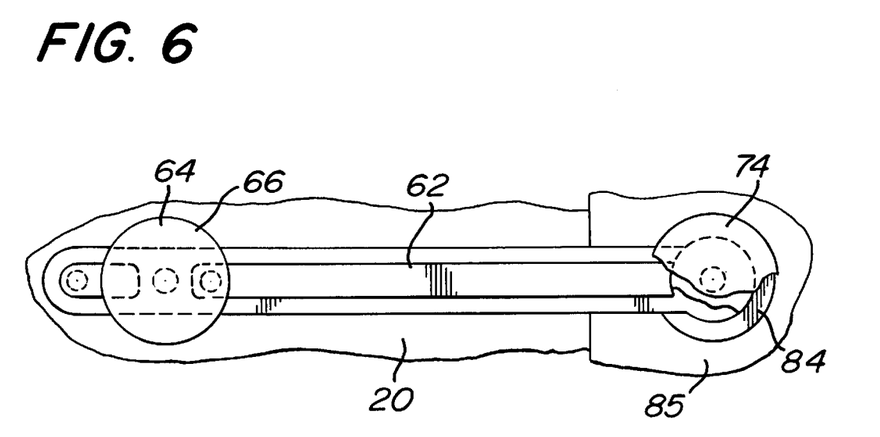
FIG. 6 is a top view of the releasable pressure clamp which is utilized to hold a piece of glass on the top of the device.
Figure 7:
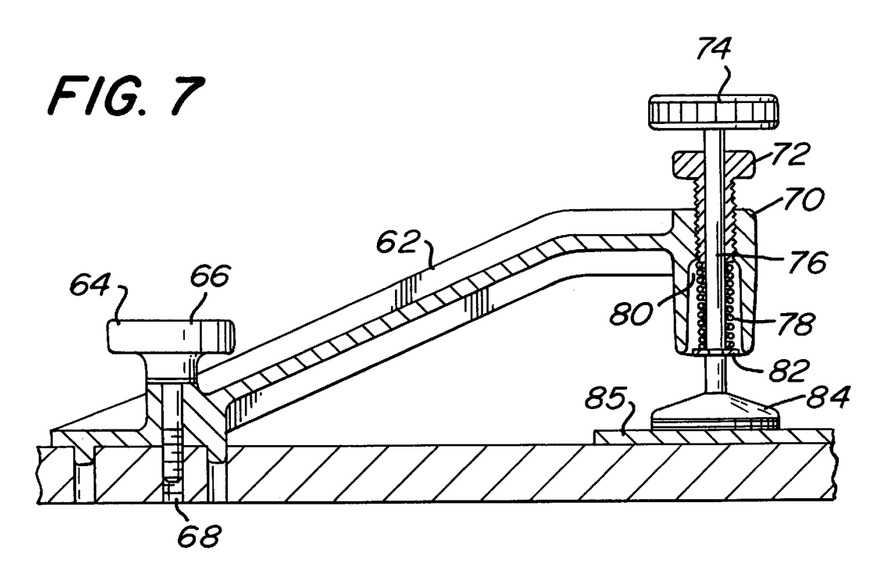
FIG. 7 is an elevational view, partly in section showing the releasable clamp of FIG. 6.

As shown in FIGS. 6 and 7, in order the assist in releasably securing a piece of glass (not shown) on the upper surface 14 of the base 12 and the platen upper surface 20 for cutting into the desired shape, the device 10 may also include a compression arm 62. The arm 62 may be releasably (or fixedly) secured at any corner of the upper surface 14 of the base 12 by a fastening member 64 comprised of a handle 66 having a threaded post 68 extending therefrom. The threaded post 68 is releasably secured through the arm 62 and then into a threaded hole (not shown) in the base upper surface 14, preferably at one of the corners thereof. The arm 62 extends toward the center of the platen upper surface 20 just as the arm of a record player may extend over a record placed on the rotating base. At the distal end 70 of the arm 62 Is located a conventional screw-type pressure clamp 72 which aids in holding a piece of glass onto the base upper surface 14 and/or the platen upper surface 20. The clamp 72 is comprised of a handle 74 to which is attached a vertical post 76. About the post 76 is a conventional compressed spring 78 which is held between a recess 80 in arm 62 and a spring retaining member 82. Secured at the end of the post 76 is a glass-engaging clamp member 84. The member 84 engages a piece of glass which is placed on the base upper surface 14 and/or platen upper surface 20 for measuring and cutting. By turning the handle, one may increase or decrease the tension on spring 78 and the resultant retaining force applied by the clamp member 84 to the glass.

The compression arm 62 may also be utilized as a platen "stop" to apply pressure to the platen upper surface 20 and thereby restrict the platen from rotating to aid in scoring or measuring a piece of glass while it is on the platen. One need merely adjust the tension on the pressure clamp 72 and compressed spring 78 to the desired pressure to be applied by the clamp member 84 to the platen surface 20.

Figure 10:
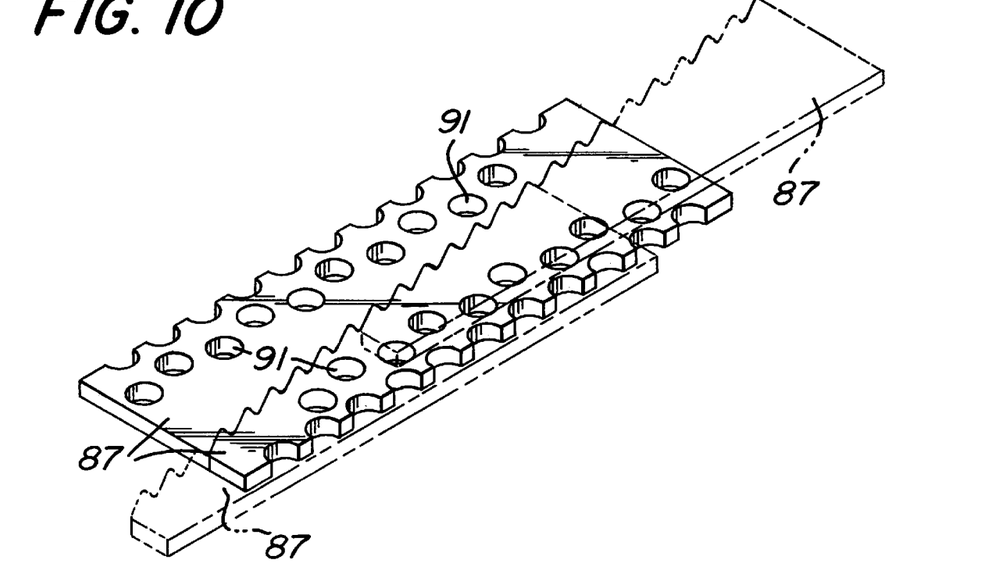
FIG. 10 shows a location device of the glass jig of the present invention.

FIG. 10 shows a location device of the glass jig of the present invention.

Figure 11:
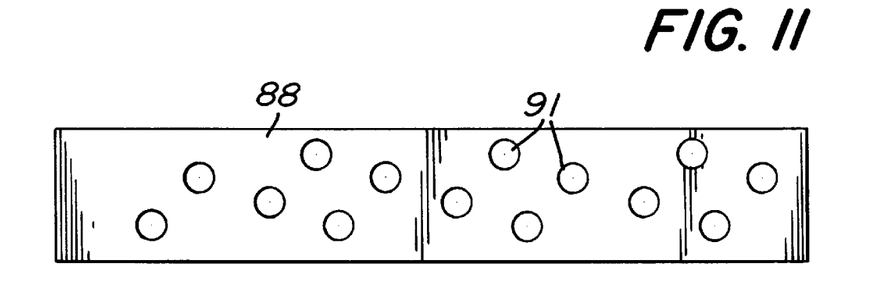
FIG. 11 shows a location device of the glass jig of the present invention.

FIG. 11 shows a location device of the glass jig of the present invention.

Figure 12:
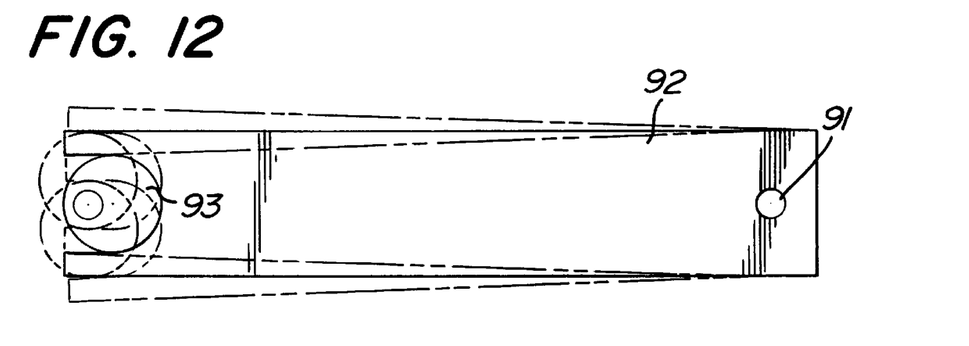
FIG. 12 shows a location de vice of the glass jig of the present invention.
Figures 13, 14, 15, 16, 17, 18:
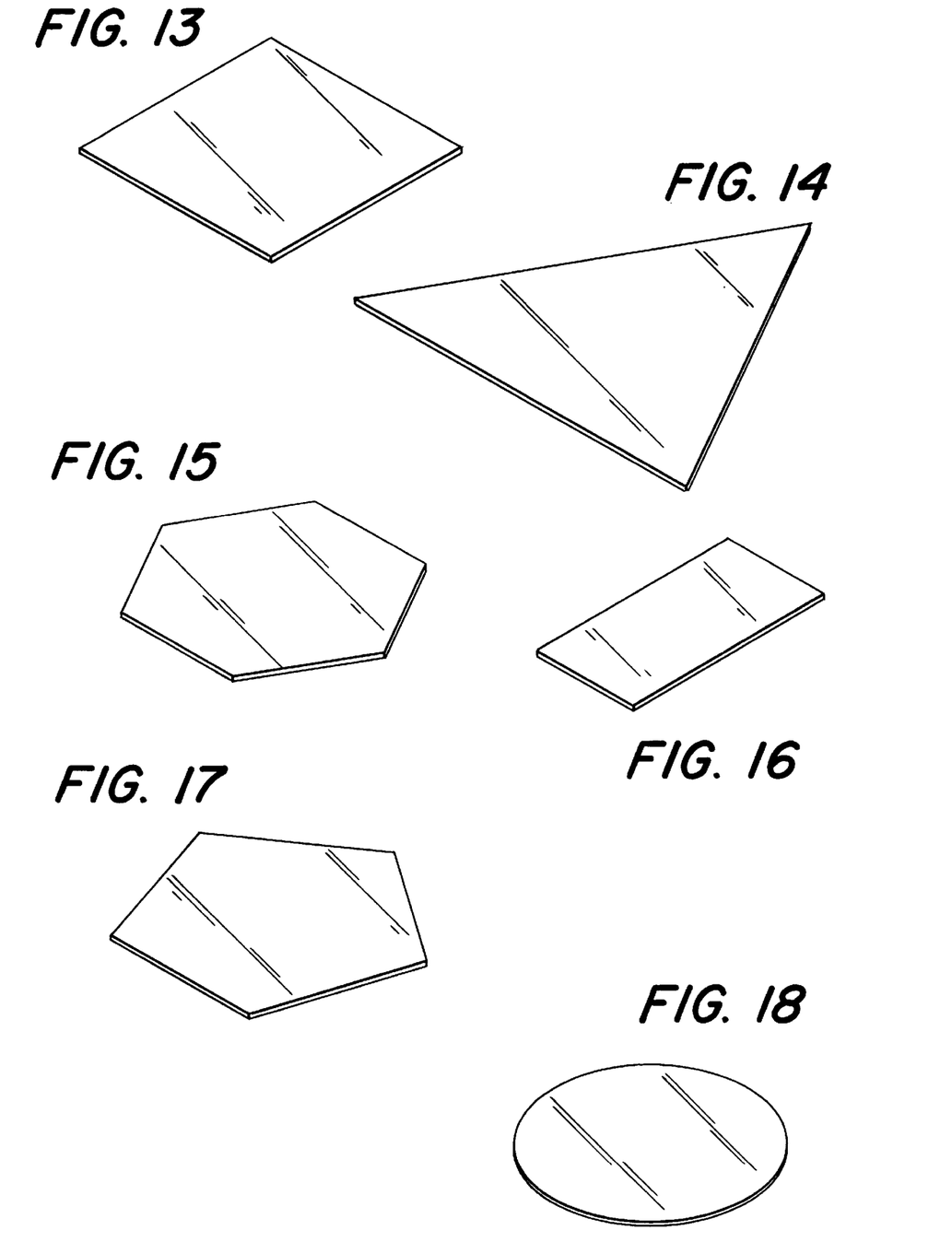
FIGS. 13–18 show various shapes of glass that can be achieved using the device of the present invention.

FIG. 12 shows a location device of the glass jig of the present invention.

When one wishes to cut a piece of glass having multiple cuts, the piece of glass (for example a square piece of glass) is placed onto the base upper surface 14 and/or platen upper surface 20 depending upon the size of the glass. One can then make the appropriate measurements utilizing the straight edge 30, alone or in combination with the indicia 34 and 36 and/or measuring device 40. Once the glass is oriented in the proper direction to achieve the cut desired, the straight edge can then be used to score the glass using a conventional hand held glass scoring device (not shown). Once the glass is scored, one may rotate the platen 18 either counterclockwise or clockwise, to orient the piece of glass for the next score to be made. This process is then continued until all the scores are made to achieve the desired result, e.g., an octagonal or other shaped piece of glass.

If one wishes to cut large panes of glass or if one wishes to cut long strips of glass which may then be subsequently cut into a series of repeated shapes (e.g., multiple diamond pieces of glass), one may utilize the adjustable stops 42. If for example one wishes to cut a piece of glass into a strip, the adjustable stops are pulled away from the base 12. The glass piece is then placed onto the platen 18 so that the glass edge extends to the tips 48 of the stops 42. One can then score the glass at the desired length by utilizing the previously described conventional scoring device along the straight edge 30. Once the glass is then cut into the desired strip, the strip can then be cut into one or more shapes, e.g., multiple square or diamond shaped pieces.

Figure 8:
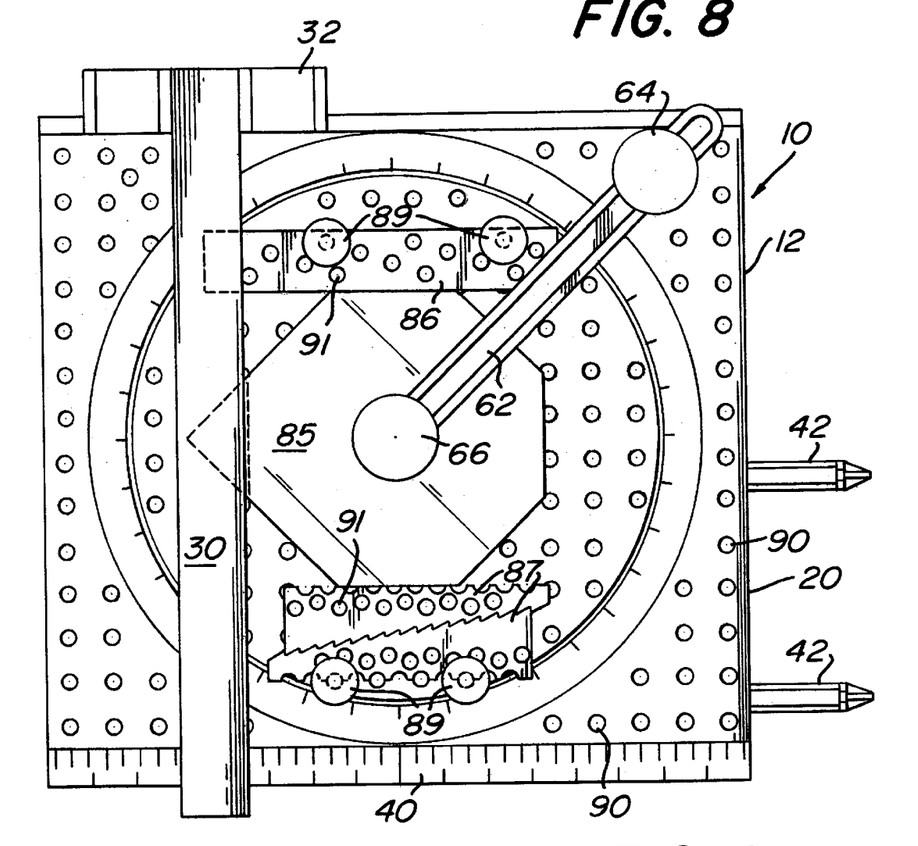
FIG. 8 is a view similar to FIG. 1, but showing the device of FIG. 1 in use.
Figure 9:
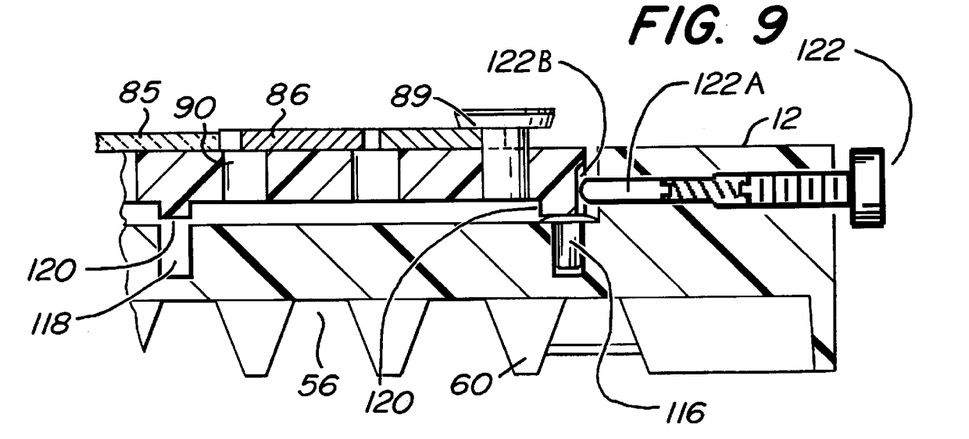
FIG. 9 is an enlarged fragmentary view showing the use of a fastener in cooperation with the base of the device including clamps.

FIG. 8 shows the device of FIG. 1 in use, and in particular producing a hexagonal piece of glass 85 utilizing the present invention. FIG. 8 shows the glass 85 being held to the upper surface 20 by various conventional clamps 86 and 87. The clamps 86 and 87 are held in place by stops 89, preferably of rubber. The stops 89 are releasably secured into holes 90 made in the platen upper surface at regular intervals. The clamps 86 and 87 aid in securing the glass 85 to be cut, onto the platen 18 as desired.

As shown in FIG. 10, clamps 87 are a pair of interfitting clamps with openings 91 to permit the passage of stops 89. Clamp 88 has a bar shape (FIG. 11) with similar openings 91.

FIG. 12 shows a location device 92 of the glass jig. The phantom positions of FIG. 12 show various locations 93 for one end of device 92.

FIGS. 13–18 show various shapes of glass that can be achieved using the device of the present invention.

To prevent the glass from moving during the process, the base and/or platen may be made of a slip-resistant surface. Alternatively, a thin piece of rubber or other non-slip material (not shown) may be inserted between the glass and the platen. In addition, a releasable pressure clamp may be used to temporarily secure the glass adjacent the platen for cutting. The clamp may be located at the end of an arm which is extendable to a position which is approximately at the center of the platen similar to that of the arm on a record player.

Without further elaboration the foregoing will so fully illustrate my invention that others may, by applying current or future knowledge, adapt the same for use under various conditions of service.

I claim:

1. A device used as an aid in scoring regular and irregular polygonal shapes into glass, the device comprising a platen rotatable on a generally rectangular base and a compression arm secured to the base, the platen having a center point and an upper surface the upper surface having a plurality of grid markings to locate the glass side to side on the platen, and a plurality of circular markings intersecting said grid markings, said circular markings enabling the location of the glass to the center point of the platen, the platen having a plurality of holes at certain of the grid markings into which locating pins, straight edges and clamps can be inserted to locate, hold and clamp the glass to a desired position, the generally rectangular base having upper and lower surfaces, the upper surface having a circular recess, the rotatable platen being seated into the circular recess the compression arm being secured to the base at a first end of the compression arm, a second end of the compression arm having a glass engaging clamp member, said second end extending over the center of the upper surface of the platen to secure a piece of glass between said glass engaging clamp member and the platen upper surface, the compression arm having a variable force retaining mechanism applicable to the glass via the glass engaging clamp member during the scoring operation, said polygonal shapes comprising a plurality of substantially straight lines.

2. The device of claim 1 including clamps and stops to hold said glass in a desired position.

3. A device used to score regular and irregular polygonal shapes into glass, the device comprising a platen rotatable on a base, a compression arm secured to the base, a lockable T-square means onto which an adjustable lockable T-square can be located to a desired position, and clamps and stops to hold said glass in position, the platen having a center point and an upper surface, the upper surface having a plurality of grid markings to locate the glass side to side on the platen, and a plurality of circular markings intersecting said grid markings, said circular markings enabling the location of the glass to the center point of the platen, the platen having a plurality of holes at certain of the grid markings into which locating pins, straight edges, said clamps and said stops can be inserted to locate, hold and clamp the glass to the desired position, the generally rectangular base having upper and lower surfaces, the upper surface having a circular recess and an outer perimeter, the rotatable platen being seated into the circular recess, the outer perimeter having degree callouts and degree markings, and the base having a plurality of markings to locate large sheets of glass, the compression arm being secured to the base at a first end of the compression arm, a second end of the compression arm having a glass engaging clamp member, said second end extending over the center of the upper surface of the platen to secure a piece of glass between said glass engaging clamp member and the platen upper surface, the compression arm having a variable force retaining mechanism applicable to the glass via the glass engaging clamp member during the scoring operation, the lockable T-square means including a scale or ruler imprinted adjacent to a glide strip on the upper surface of the platen for indicating a distance from the center of the platen to a desired score mark, said polygonal shapes comprising a plurality of substantially straight lines.

* * * * *